United States Patent
Ai et al.

(10) Patent No.: US 8,462,687 B2
(45) Date of Patent: Jun. 11, 2013

(54) METHOD AND APPARATUS FOR RECOVERY PROCESSING OF SYNCHRONOUSLY TRANSMITTED SERVICE DATA

(75) Inventors: Jianxun Ai, Shenzhen (CN); Cuifeng Yao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 209 days.

(21) Appl. No.: 13/058,525

(22) PCT Filed: Jul. 3, 2009

(86) PCT No.: PCT/CN2009/072628
§ 371 (c)(1),
(2), (4) Date: Feb. 10, 2011

(87) PCT Pub. No.: WO2010/017728
PCT Pub. Date: Feb. 18, 2010

(65) Prior Publication Data
US 2011/0141964 A1 Jun. 16, 2011

(30) Foreign Application Priority Data
Aug. 14, 2008 (CN) .......................... 2008 1 0131394

(51) Int. Cl.
*H04H 20/71* (2008.01)
*H04L 12/56* (2006.01)
*H04J 3/24* (2006.01)

(52) U.S. Cl.
USPC ............................. 370/312; 370/394; 370/473

(58) Field of Classification Search
None
See application file for complete search history.

(56) References Cited

U.S. PATENT DOCUMENTS

| | | | | |
|---|---|---|---|---|
| 8,116,250 | B2 * | 2/2012 | Lindskog et al. ............. | 370/312 |
| 2008/0151805 | A1 * | 6/2008 | Vayanos et al. ............... | 370/312 |
| 2010/0165901 | A1 * | 7/2010 | Kim .............................. | 370/312 |
| 2010/0189026 | A1 * | 7/2010 | Lee et al. ...................... | 370/312 |

FOREIGN PATENT DOCUMENTS

| | | |
|---|---|---|
| CN | 1691571 | 11/2005 |
| CN | 101047437 | 10/2007 |
| CN | 101047492 | 10/2007 |
| CN | 101051864 | 10/2007 |
| WO | 01/56249 | 8/2001 |

* cited by examiner

*Primary Examiner* — Clemence Han
(74) *Attorney, Agent, or Firm* — Marger Johnson & McCollom PC (57) ABSTRACT

A method and apparatus for recovering synchronization among transmitted service data are disclosed in the present invention. The method comprises: a first network element sending a request to a second network element, the request carrying first information and identification information of data stream, wherein, the request is used to acquire a Radio Link Control sequence number of a Radio Link Control protocol data unit corresponding to the data packet indicated by the first information in the data stream; the first network element receiving second information returned by the second network element according to the request and allocating the Radio Link control sequence number carried in the second information to the Radio Link Control protocol data unit in the first network element.

19 Claims, 7 Drawing Sheets

FIG. 1

Prior Art

FIG. 2

Prior Art

METHOD AND APPARATUS FOR RECOVERY PROCESSING OF SYNCHRONOUSLY TRANSMITTED SERVICE DATA

RELATED APPLICATIONS

This application is a U.S. national phase application of PCT International Application No. PCT/CN2009/072628, filed Jul. 3, 2009, which claims priority of Chinese Patent Application No. 200810131394.9, filed Aug. 14, 2008, the contents of both of which are incorporated herein by reference in their entirety.

TECHNICAL FIELD

The present invention relates to the field of communication, and more especially, to a method and apparatus for recovering the synchronization among transmitted service data.

BACKGROUND OF THE RELATED ART

With the rapid development of Internet and the appearance of various multimedia services, the needs for the mobile communication is not limited to the telephone and message services, nowadays, application service is introduced to the multimedia services, and the feature of the application service is that a plurality of users could simultaneously receive the same data, such as video on demand, TV broadcasting, video conference, online education, and interactive games.

In order to use the mobile network resource effectively, multimedia broadcast multicast service (MBMS) technique is proposed, and the MBMS is a point to multipoint service in which a data source sends data to a plurality of users. With this service, the network resource including the mobile core network and access network resource, especially the air interface resource, can be shared. Moreover, the MBMS in 3GPP can implement not only the multicast and broadcast of low speed pure text messages, but also the multicast and broadcast of high speed multimedia service.

The MBMS single frequency network (MBSFN) is a technique which can improve the utilization efficiency of the MBMS service frequencies. In the MBSFN, the adjacent cells send the same radio signal synchronously, and the user equipment (UE) could consider the signals from different base stations as a multi-path signal. A plurality of cells which send the MBMS service radio signals synchronously consist in the MBSFN-synchronized area, and the cells in the MBSFN-synchronized area send the same MBMS service signal synchronously, and these cells are called MBSFN cells.

Figure 1:
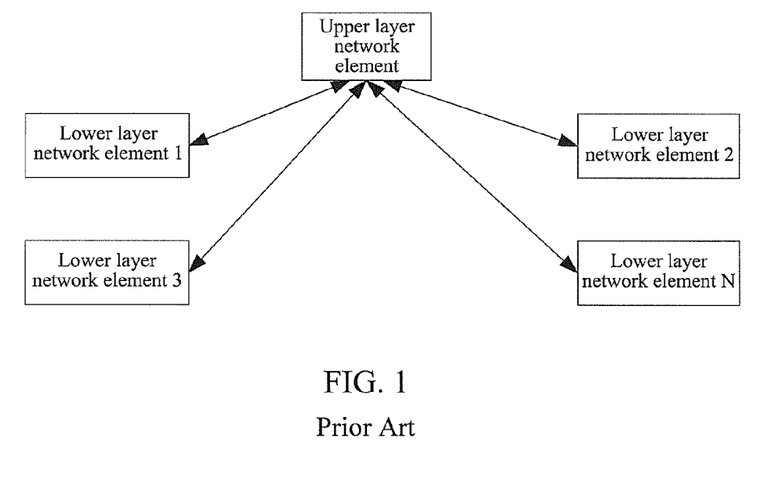
FIG. 1 is a block diagram of the logic structure of the upper layer and lower layer network elements in the prior art.
Figure 2:
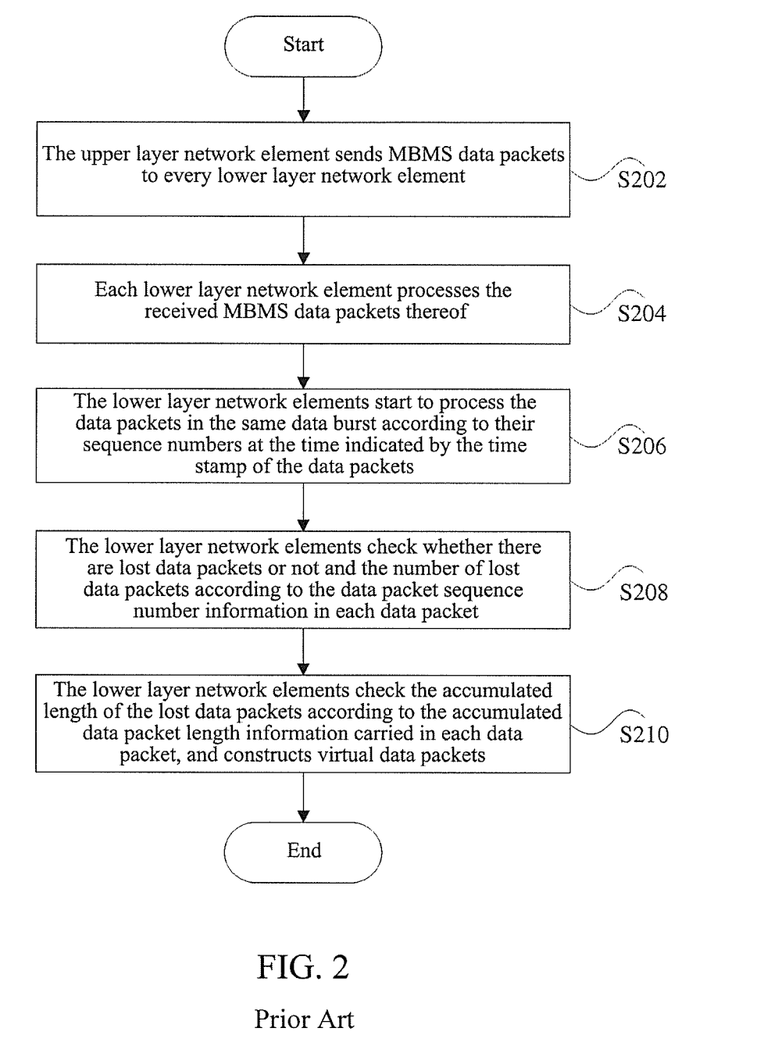
FIG. 2 is a flow chart of the method for implementing the MBMS synchronization in the prior art.

Since the MBMS service is a service facing to all networks, the same MBMS service can be established in different lower layer network element nodes, specifically, an upper layer network element sends data stream to lower layer network elements, wherein, the data stream comprises a plurality of data bursts, and each data burst comprises a plurality of data packets. At present, the following method is applied for a plurality of network elements to implement the MBMS services synchronization among the cells. FIG. 1 shows the block diagram of the logic structure of the upper layer and the lower layer network elements. From FIG. 1, it can be seen that one upper layer network element connects with a plurality of lower layer network elements to interact signaling. FIG. 2 is a flow chart of the method for implementing the MBMS synchronization in the prior art, and as shown in FIG. 2, the method comprises the following procedures:

S202, an upper layer network element sends MBMS service data packets to every lower layer network element, wherein, the data packet carries the time stamp information, the data packet sequence number information and the cumulative data packet length information etc. For one or more continuous data packets which need the concatenation processing of the radio link control (RLC) protocol layer, the upper layer network element identifies the one or more data packets with the same time stamp information, and the one or more data packets identified with the same time stamp consist in a data burst, a data burst could be a group of continuous data packets or a single data packet;

S204, every lower layer network element receives the above MBMS service data packets, wherein, RLC concatenation processing is performed for the data packets in the same data burst rather than in different data bursts;

S206, the lower layer network elements start to process the data packets in the same data burst according to their sequence numbers at the time indicated by their indentified time stamps;

S208, the lower layer network elements check whether there is lost packet or not and the number of lost packets according to the data packet sequence number information in each data packet;

S210, the lower layer network elements detect the cumulative length of the lost packets according to the cumulative data packet length information carried in each data packet and construct virtual data packets.

Since the MBMS service data packets that the upper layer network element sends to each lower layer network element are the same, the lower layer network elements can perform the same processing to implement the synchronous transmission of the MBMS service among the cells in which all lower layer network elements locates.

With the above method, the lower layer network elements could construct virtual data packets according to the number and the total length of lost data packets when the lower layer network elements detect that there is lost data packet, wherein the number and the total length of the virtual data packets are the same as those of the lost data packets. After constructing the virtual data packets, the lower layer network elements add the constructed virtual data packets into the user plane protocol processing, and it acts as the lost data packets having not lost. However, the lower layer network elements do not send the user plane data blocks (RLC PDU or MAC PDU) including the virtual data packets to guarantee subsequent processing for the data packets in the same way as processing by the other lower layer network elements, and to avoid the radio interference among the adjacent cells due to the inconsistence between the virtual data packets and the actual ones.

It should be noted that the upper network element and one or more low layer network elements are identical or different in physical function, "upper layer network element" and "lower layer network elements" are only logic divisions and these network elements work together to implement the service synchronization function, that is, several identical or different physical network elements are divided into one upper network element and one or more low layer network elements according to their logic functions, and these network elements work together to send the MBMS service in cells where lower layer network elements are located in the way of multi-cell combination.

There are the following problems in the above-mentioned method for implementing the MBMS service synchronization among the cells where a plurality of network elements are located:

1. In the above-mentioned method for implementing the MBMS service synchronization among the cells where a plurality of network elements are located, each lower layer network element individually implements the RLC processing for the MBMS service data packets, which specifically comprises assigning RLC sequence number, RLC segmentation and concatenation. In normal conditions, each lower layer network element maintains the current RLC sequence number and performs the above RLC processing according to the currently received data packet. Since the initial RLC sequence number assigned by each lower layer network element could be synchronous through the configuration, the consistence of RLC sequence number assignment could be guaranteed by every lower layer network element in data processing. However, in the method for implementing the MBMS service synchronization among the cells where a plurality of network elements are located, when a lower layer network element restarts owing to management reasons or abnormal conditions, this lower layer network element cannot determine the right RLC sequence number, thus it cannot maintain RLC sequence number synchronization with other lower layer network elements which have not restarted.

2. In the process that the data are transmitted from the upper layer network element to the lower layer network elements, there might have lost data packets and these lost data packets could be continuous. According to the prior art, the lower layer network elements can detect the number and the total length of the lost data packets, and according to which construct virtual lost data packets, perform user plane processing for these virtual data packets, like that these data packets were not lost, thus to guarantee the consistence between the processing condition of the subsequently received data packets and that of the other lower layer network elements having no lost data packets, and also to guarantee its synchronization with other lower layer network elements after correctly receiving the subsequent data packets in the case that there are lost data packets.

However, the data packets of a previous data burst might not concatenate with the data packets in the data burst behind it in the same RLC PDU, if the data packets in the previous data burst do not fully occupy one RLC PDU or MAC SDU, the RLC PDU or MAC SDU is filled in the RLC or MAC layer, and the size of the filled data depends on the unoccupied space in the RLC PDU or the MAC PDU. In the condition that there are continuous lost data, the lower layer network elements cannot determine whether the several lost data packets belong to the same data burst or not, and also cannot determine whether these data packets should be concatenated with each other or be filled or not, that is, the size of the RLC PDU or MAC PDU space actually occupied by the lost data packets cannot be calculated correctly.

In the above condition, the lower layer network elements which have lost data or which have restarted cannot be RLC serial number synchronous with other lower layer network elements which operate properly, thus there is radio interference among the cells.

SUMMARY OF THE INVENTION

The present invention is proposed to resolve the problem of radio interference in the prior art due to the failure of RLC sequence number synchronization between the lower layer network elements which have lost data packets or which have restarted and the lower layer network elements which work properly, therefore, the main object of the present invention is to provide a method and apparatus for recovering the synchronization among transmitted service data to resolve the above problem.

In order to achieve the above object of the present invention, one aspect of the present invention is to provide a method for recovering the synchronization among transmitted service data.

A method for recovering the synchronization among transmitted service data in accordance with the present invention comprises: a first network element sending a request to a second network element, wherein the request carries first information and identification information of data stream, wherein, the request is used to acquire a RLC serial number of a RLC PDU corresponding to the data packet indicated by the first information in the data stream; the first network element receiving second information returned by the second network element according to the request and allocating the RLC serial number carried in the second information to the RLC PDU in the first network element, wherein, the first and second network elements are lower layer network elements, and the data stream received by the first network element is sent by an upper layer network element.

In order to achieve the above object of the present invention, another aspect of the present invention is to provide a method for recovering the synchronization among transmitted service data.

The method for recovering the synchronization among transmitted service data in accordance with the present invention comprises: a first network element sending identification information of received data stream to a second network element, wherein, the identification information of the data stream is used to request for a RLC serial number of a RLC PDU corresponding to a data packet in the data stream; the first network element receiving response information returned from the second network element according to the identification information of the data stream, wherein, the response information carries first information and a RLC sequence number of a RLC PDU in the data stream corresponding to the identification information of the data stream, wherein, the first information is used to identify the RLC PDU.

In order to achieve the above object of the present invention, still another aspect of the present invention is to provide an apparatus for recovering the synchronization among transmitted service data, wherein, the apparatus is located in the side of a first network element.

An apparatus for recovering the synchronization among transmitted service data in accordance with the present invention comprises: a transmission module used to send a request to the second network element, wherein, the request carries first information and identification information of data stream received by a first network element, and the request is used to acquire a RLC serial number of a RLC PDU corresponding to a data packet indicated by the first information in the data stream; a processing module used to receive second information returned by the second network element according to the request, and allocate the RLC sequence number carried in the second information to the RLC PDU in the first network element.

In order to implement the above object of the present invention, still another aspect of the present invention is to provide an apparatus for recovering the synchronization among transmitted service data, wherein, the apparatus is located in the side of a first network element.

An apparatus for recovering the synchronization among transmitted service data in accordance with the present invention comprises: a transmission module used to send identification information of the received data stream to a second network element, wherein, the identification information of the data stream is used to request for a RLC sequence number of a RLC PDU corresponding to a data packet in the data stream; a processing module used to receive response information returned by the second network element according to the identification information of the data stream, wherein, the response information carries first information and RLC sequence number of the RLC PDU in the data stream corresponding to the identification information of the data stream, wherein, the first information is used to identify the RLC PDU.

With at least one of the above technical schemes in the present invention, the lower layer network elements which have lost data packets or which have restarted acquire the right RLC sequence number from the lower layer network elements which work properly so as to guarantee the RLC sequence number synchronization among the lower layer network elements, thus avoid the radio interference among the adjacent cells.

BRIEF DESCRIPTION OF DRAWINGS

The accompanying figures are used to further understand the present invention and consist in a part of the present invention; they are used to illustrate the present invention with the combination of the embodiments rather than to confine the present invention. In the accompanying figures.

PREFERRED EMBODIMENTS OF THE PRESENT INVENTION

Function Summary

Aim to the problem of interference between radio signals due to the failure of RLC serial number synchronization between the lower layer network elements which have lost data or which restarted and other lower layer network elements which work properly, an embodiment of the present invention offers an improved scheme to synchronously transmit the service data. In this embodiment of the present invention, a certain lower layer network element transmits a request carrying the first information and the identification information of a data stream to another lower layer network element so as to obtain the RLC sequence number of the RLC PDU corresponding to the data indicated by the first information in the data stream, and this lower layer network element receives the second information carrying the RLC sequence number returned by the other network element and allocates the RLC sequence number carried in the second information to the RLC PDU therein.

In the condition that there is no conflict, the embodiments and the features in the embodiments of this application could be combined with one another.

In the following, the preferred embodiments of the present invention will be described with combination of the accompanying figures, and it should be understood that the preferred embodiment is only used to illustrate and explain the present invention rather than restrict the present invention.

Method Embodiment 1

According to an embodiment of the present invention, a method for recovery processing the data is provided.

Figure 3:
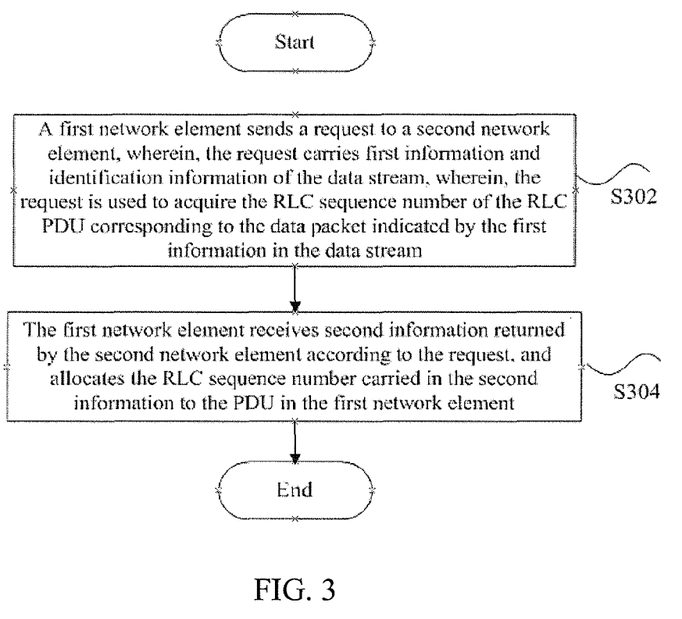
FIG. 3 is a flow chart of the method for recovering the synchronization among transmitted service data in accordance with a first embodiment of the present invention.

FIG. 3 is a flow chart of the method for recovering synchronization among transmitted service data in accordance with an embodiment of the present invention, and as shown in FIG. 3, the method comprises the following steps:

S302, a first network element sends a request to a second network element, and the request carries the first information and identification information of the data stream, wherein the request is used to acquire the RLC sequence number of the RLC PDU corresponding to the data packets indicated by the first information in the data stream;

S304, the first network element receives the second information returned from the second network element according to the request and allocates the RLC sequence number carried in the second information to the RLC PDU in the first network element. Before implementing S302, the first network element receives the data stream sent by its upper layer network element, wherein, the first and second network elements are two lower layer network elements.

With the technical scheme provided in the embodiment of the present invention, the lower layer network elements which have lost data or which restarted acquire the right RLC sequence number from other lower layer network elements which work properly so as to guarantee the RLC sequence number synchronization among the lower layer network elements, thus avoid the radio interference among the adjacent cells.

Wherein, the upper network element and the lower layer network elements could apply the following network element combinations, however, not restrict to the following combinations:

Combination 1, in networking for MBMS service synchronization in the UTRAN, the upper layer network element is a upper layer Radio Network Controller (RNC) and the lower layer network elements are lower layer RNCs, wherein, the interface between the upper layer network element and the lower layer network elements is Iur interface, and in this combination, the upper layer network element and the lower layer network elements are network elements with the same physical function.

Combination 2, in networking for MBMS service synchronization in enhanced High Speed Packet Access system (HSPA+), the upper layer network element is a master RNC or a master Node B+ and the lower layer network elements are slave Node B +, wherein, the interface between the upper layer network element and the lower layer network elements is Iur interface, and in this combination, the upper layer and lower layer network elements are network elements with the same physical function and different logic function.

Combination 3, in networking for MBMS service synchronization in LTE, the upper layer network element is a MBMS Gateway (MGW) or MCE, and the lower layer network elements are E-UTRAN NodeBs, wherein, the interface between the upper layer network element and the lower layer network elements is M2 interface.

In the condition that data stream is a MBMS data packet stream, the identification information of the data stream comprises but is not confined to at least one of the following items: the MBMS identifier and the signaling connection identifier established for the data flow by the first and second network elements; in the condition that the data flow is a plurality of MBMS data packet flows, the identification information of the data flow comprises without limitation at least one of the following items: the identifier allocated to the data stream by the upper network elements of the first and second network elements, and the signaling connection identifier established for the data stream by the first and second network elements.

Preferably, in the condition that the abovementioned first information is the time stamp information of the data burst in the data stream, the embodiment will be illustrated with Example 1.

EXAMPLE 1

In the condition that lower layer network element 1 (the abovementioned first network element) restarts or detects that there are a plurality of continuous lost MBMS data packets during the MBMS service, lower layer network element 1 sends message 1 (the abovementioned request) to lower layer network element 2 (the abovementioned second network element), wherein, message 1 carries the MBMS service identifier (the abovementioned identification information of the data stream) and the time stamp information of a data burst in the MBMS service, and this data burst could be any data burst in the MBMS received by lower layer network elements 1 and 2.

Lower layer network element 2 receives the above message 1, and in the condition that the lower layer network element 2 maintains the RLC protocol processing of the MBMS service, lower layer network element 2 searches for the corresponding data burst in the data stream according to the time stamp information of the above data burst, and send message 2 to the lower layer network elements after determining the RLC sequence number of the first RLC PDU corresponding to the first data packet in data burst. Wherein, message 2 carries the time stamp information of the abovementioned data burst, the MBMS service identifier and the RLC sequence number of the first RLC PDU corresponding to the first data packet in the data burst.

Lower layer network element 1 receives the above message 2, and performs RLC processing for the MBMS data packets according to the information carried in message 2, specifically, allocates the RLC sequence number in message 2 to the RLC PDU corresponding to the first data packet in the data burst corresponding to the time stamp information in message 1.

Figure 4:
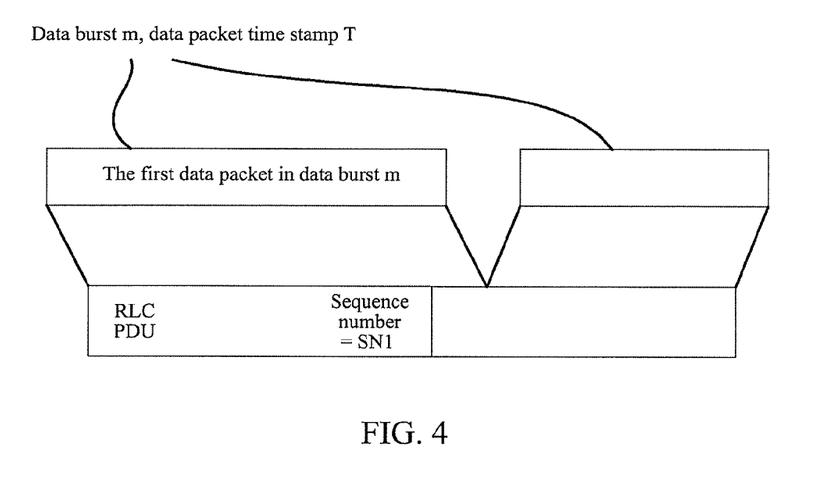
FIG. 4 is an illustration of the message structure in Example 1 of the method shown in FIG. 3.

As shown in FIG. 4, the time stamp of data burst carried in the abovementioned message 1 is T, after lower layer network element 2 receives message 1, it searches for the first data packet in the data burst corresponding to the time stamp T, and if the RLC sequence number allocated to the first RLC PDU of the data packet is SN1, it takes SN1 as message 2 and sends it to lower layer network element 1, and after lower layer network element 1 receives message 2, it sets the RLC sequence number of the first RLC PDU corresponding to the first data packet in the data burst whose time stamp is T as SN1.

Preferably, take Example 2 for example to illustrate the condition that the above message 1 is the identifier of the data burst in the data stream allocated by the upper network element of the first and second network elements.

EXAMPLE 2

In the condition that lower layer network element 1 restarts or detects a plurality of continuous lost MBMS data packets during the MBMS service, lower layer network element 1 sends message 1 to lower layer network element 2, wherein, message 1 carries the MBMS service identifier and the identifier of a certain data burst in the MBMS service, and the data burst may be any data burst in the MBMS service received by lower layer network elements 1 and 2.

Lower layer network element 2 receives the above message 1, and in the condition that lower layer network element 2 maintains the RLC processing of the MBMS service, lower layer network element 2 determines the RLC sequence number of the first RLC PDU corresponding to the first data packet in the data burst by searching for the corresponding data burst in the data flow according to the identifier of the above data burst, and sends message 2 to lower layer network element 1, wherein, message 2 carries the identifier of the above-mentioned data burst, the MBMS service identifier, and the RLC sequence number of the first RLC PDU corresponding to the first data packet in the data burst.

Lower layer network element 1 receives the abovementioned message 2, performs RLC processing for the MBMS service data packets according to the information carried in message 2, specifically, allocates the RLC sequence number in message 2 to the RLC PDU corresponding to the first data packet in the data burst corresponding to the data burst identifier in message 1.

Figure 5:
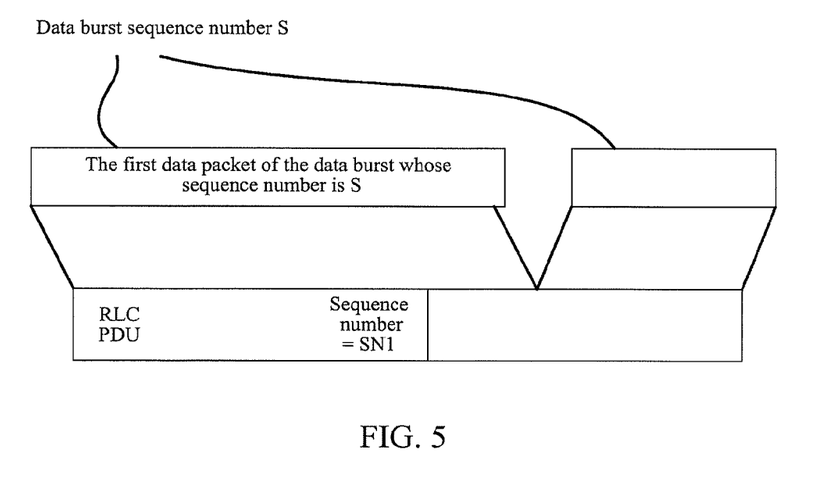
FIG. 5 is an illustration of the message structure in Example 2 of the method shown in FIG. 3.

As shown in FIG. 5, the data burst sequence number carried in the abovementioned message 1 is S, and after lower layer network element 2 receives message 1, it searches for the first data packet in the data burst corresponding to the data burst sequence number S, and if the RLC sequence number allocated to the first RLC PDU of the data packet is SN1, SN1 will be used as message 2 and sent to lower layer network element 1, and after lower layer network element 1 receives message 2, it sets the RLC sequence number of the first RLC PDU corresponding to the first data packet in the data burst whose identifier is S as SN1.

Preferably, take Example 3 as example to illustrate the condition that the abovementioned message 1 is the sequence number of a data packet in the data stream, and the data packet is the first data packet in a certain data burst.

EXAMPLE 3

In the condition that lower layer network element 1 restarts or detects a plurality of continuous lost MBMS data packets during the MBMS service, lower layer network element 1 sends message 1 to lower layer network element 2, wherein, message 1 carries the MBMS service identifier and the sequence number of a certain data packet in the MBMS service, and the data packet could be any data packet in the MBMS service received by lower layer network elements 1 and 2.

Lower layer network element 2 receives the abovementioned message 1, and in the condition that lower layer network element 2 maintains the RLC processing of MBMS service, the lower layer network element 2 determines the RLC sequence number of the first RLC PDU in the data packet by searching for the corresponding data packet in the data flow according to the sequence number of the above data packet, and sends message 2 to lower layer network element 1, wherein, message 2 carries the sequence number of the above data packet, the MBMS service identifier, and the RLC sequence number of the first RLC PDU in the data packet.

After lower layer network element 1 receives the abovementioned message 2, it performs the RLC processing for the MBMS service data packets according to the information carried in message 2; specifically, it allocates the RLC sequence number in message 2 to the first RLC PDU corresponding to the data packets in message 1.

Figure 6:
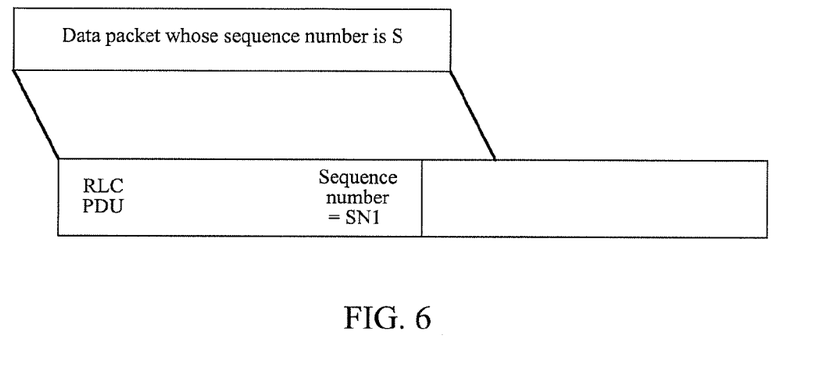
FIG. 6 is an illustration of the message structure in Example 3 of the method shown in FIG. 3.

As shown in FIG. 6, the service data packet sequence number in the abovementioned message 1 is S, and after lower layer network element 2 receives message 1, it searches for the data packet corresponding to the service data packet sequence number S, if the RLC sequence number allocated to the first RLC PDU in the data packet is SN1, SN1 will be taken as message 2 and sent to lower layer network element 1, and after lower layer network element 1 receives message 2, it sets the RLC sequence number of the first RLC PDU corresponding to the data packet whose service data packet sequence number is S as SN1.

Preferably, take example 4 for example to illustrate the condition that the abovementioned first message is the sequence number of the data packet in the data stream, and the data packet is any data packet in a certain data burst.

EXAMPLE 4

In the condition that lower layer network element 1 restarts or detects a plurality of continuous lost MBMS data packets during the MBMS service, lower layer network element 1 sends message 1 to lower layer network element 2, wherein, message 1 carries MBMS service identifier and the sequence number of a certain data packet in the MBMS service, and the data packet could be any data packet in the MBMS service received by lower layer network elements 1 and 2.

Lower layer network element 2 receives the abovementioned message 1, and in the condition that lower layer network element 2 maintains the RLC protocol processing of the MBMS service, lower layer network element 2 searches for the corresponding data packet in the data stream according to the sequence number of the abovementioned data packet, determines the RLC sequence number of the first RLC PDU in the data packet and the position information of the first byte of the data packet in the RLC PDU (that is, the offset of the data packet in the RLC PDU), and sends message 2 to lower layer network element 1, wherein, message 2 carries the RLC sequence number of the first RLC PDU in the data packet, the position information of the first byte of the data packet in the data packet, the MBMS service identifier, and the sequence number of the above-mentioned data packet.

Lower layer network element 1 receives the abovementioned message 2 and performs RLC protocol processing for the MBMS service data packets according to the information carried in message 2, specifically, it allocates the RLC sequence number in message 2 to the first RLC PDU corresponding to the data packet in message 1 and sets the offset of the first byte of the data packet in the first RLC PDU as the offset information indicated by message 2.

Figure 7:
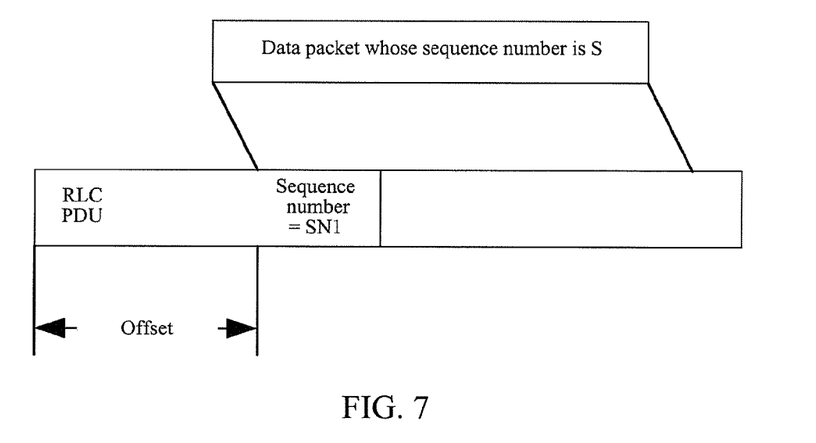
FIG. 7 is an illustration of the message structure in Example 4 of the method shown in FIG. 3.

As shown in FIG. 7, the data packet sequence number carried in the abovementioned message 1 is S, after the lower layer network element 2 receives message 1, it searches for the data packet corresponding to the service data packet sequence number S, and if the RLC sequence number allocated to the first RLC PDU of the data packet is SN1 and the offset of the first byte of the data packet in the RLC PDU is Offset, SN1 and Offset will act as message 2 to be sent to lower layer network element 1, after lower layer network element 1 receives message 2, it sets the RLC sequence number of the first RLC PDU corresponding to the data packet whose service data packet sequence number is S as SN1, and sets the offset of the first byte of this data packet in the first RLC PDU as Offset.

Method Embodiment 2

According to the embodiment of the present invention, a method for recovering the synchronization among transmitted service data is provided.

Figure 8:
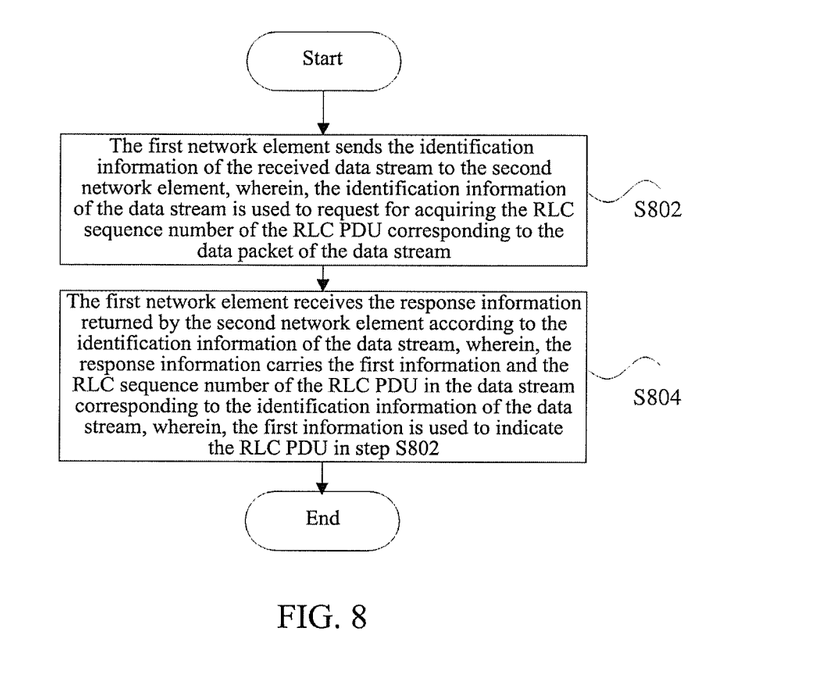
FIG. 8 is a flow chart of the method for recovering the synchronization among transmitted service data in accordance with a second embodiment of the present invention.

FIG. 8 is a flow chart of the method for recovering the synchronization among transmitted service data in accordance with an embodiment of the present invention, and as shown in FIG. 8, the method comprises the following steps:

S802, a first network element sends the identification information of the received data stream thereof to a second network element, wherein, the identification information of the data stream is used to acquire the RLC sequence number of the RLC PDU corresponding to the data packet in the data stream;

S804, the first network element receives the response information returned from the second network element according to the identification information of the abovementioned data stream, wherein, the response information carries the first information and the RLC sequence number of the RLC PDU in the data stream corresponding to the identification information of the data stream, wherein, the first information is used to identify the RLC PDU in S802;

Wherein, the abovementioned first information could comprise without limitation at least one of the following items: the time stamp information of a data burst in the data stream, the identifier of a data burst in the data stream allocated by the upper layer network element of the first and second network elements, and the sequence number of a data packet in the data stream, and in the following, the embodiment of the present invention will be illustrated respectively according to the above-mentioned three cases.

Case one: in the condition that the first information is the time stamp information of a data burst in the data stream allocated by the upper layer network element of the first and second network elements, the RLC sequence number of the RLC PDU is the RLC sequence number of the first RLC PDU corresponding to the first data packet in the data burst, correspondingly, after the first network element receives the response information, it determines the corresponding data burst according to the time stamp information and allocates a RLC sequence number to the first RLC PDU corresponding to the first data packet in the determined data burst.

Case two: in the condition that the first information is the sequence number of a data packet in the data stream, the RLC sequence number of the RLC PDU is the RLC sequence number of the first RLC PDU corresponding to the data packet, correspondingly, after the first network element receives the response information, it determines the corresponding data packet according to the sequence number of the data packet and allocates a RLC sequence number to the first RLC PDU corresponding to the determined data packet.

Case three: in the condition that the first information is the identifier of a data burst in the data stream allocated by the upper network element of the first and second network elements, the RLC sequence number of the RLC PDU is the RLC sequence number of the first RLC PDU corresponding to the first data packet in the data burst, correspondingly, after the first network element receives the response information, it determines the corresponding data burst according to the identifier of the data burst and allocates a RLC sequence number to the first RLC PDU corresponding to the first data packet in the determined data burst.

Apparatus Embodiment 1

Figure 9:
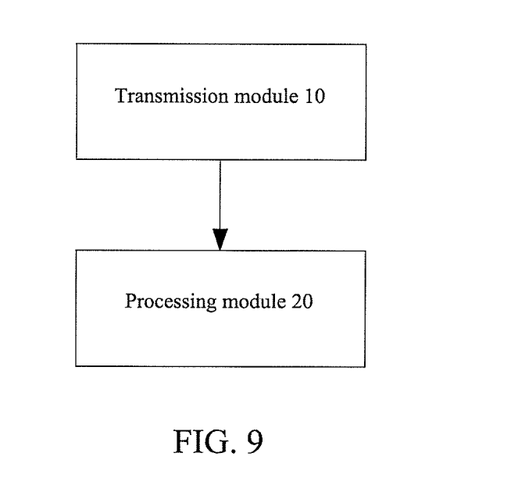
FIG. 9 is a block diagram of the apparatus for recovering the synchronization among transmitted service data in accordance with a first apparatus embodiment of the present invention.

According to the embodiment of the present invention, an apparatus for recovering the synchronization among transmitted service data is provided. FIG. 9 is a block diagram of the apparatus for recovering the synchronization among transmitted service data in accordance with an embodiment of the present invention, and as shown in FIG. 9, the apparatus comprises the transmission module 10 and the processing module 20.

The function of each above-mentioned module will be described in further detail in the following.

The transmission module 10 is used to send a request to the second network element, wherein, the request carries the first information and the identification information of the data stream received by the first network element, wherein, the first information is used to request for the RLC sequence number of a RLC PDU in the data packet received by the first and second network elements;

The processing module 20 is used to receive the second information returned by the second network element according to the request, and allocate the RLC sequence number carried in the second information to the RLC PDU in the first network element, and this module might connect to the transmission module 10.

Apparatus Embodiment 2

According to the embodiment of the present invention, an apparatus for recovering the synchronization among transmitted service data is provided.

Figure 10:
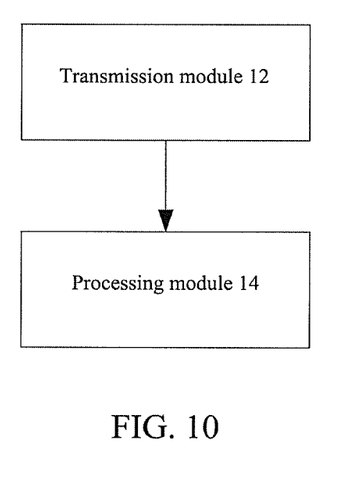
FIG. 10 is a block diagram of the apparatus for recovering the synchronization among transmitted service data in accordance with a second apparatus embodiment of the present invention

FIG. 10 is a block diagram of the apparatus for recovering the synchronization among transmitted service data in accordance with an embodiment of the present invention, and as shown in FIG. 10, the apparatus comprises the transmission module 12 and the processing module 14, wherein, The transmission module 12 is used to send the identification information of the received data stream to the second network element, wherein, the identification information of the data stream is used to request for the RLC sequence number of a RLC PDU corresponding to the data packet in the data stream;

The processing module 14 is used to receive the response information returned by the second network element according to the identification information of the data stream, wherein, the response information carries the first information and the RLC sequence number of the RLC PDU in the data stream corresponding to the identification information of the data stream, wherein, the first information is used to identify the RLC PDU.

With the apparatus for recovering the synchronization among transmitted service data in accordance with the embodiments of the present invention, the lower layer network elements which have lost data or have restarted acquire the right RLC sequence number from other network elements which work properly so as to guarantee the RLC sequence number synchronization among the lower layer network elements, thus avoid the radio interference among the adjacent cells.

As above mentioned, with the method/apparatus for recovering the synchronization among transmitted service data provided in the present invention, the lower layer network elements which have lost data or have restarted acquire the right RLC sequence number from other network elements which work properly so as to guarantee the RLC sequence number synchronization among the lower layer network elements, thus avoid the radio interference among the adjacent cells.

It should be noted that the above description is only the preferred embodiments of the present invention, and is not used to limit the scope of the present invention, for those skilled in the field, the present invention may have various modification and transformations. Without departing from the spirit and essence of the present invention, all these kinds of modification, equivalent alternatives or improvements made should belong to the scope of the claims of the present invention.

Industrial Applicability

With the technical schemes in the present invention, the lower layer network elements which have lost data packets or which have restarted acquire the right RLC sequence number from the lower layer network elements which work properly so as to guarantee the RLC sequence number synchronization among the lower layer network elements, thus avoid the radio interference among the adjacent cells.

What we claim is:

1. A method for recovering synchronization among transmitted service data, a first and second network elements being lower layer network elements, said first network element receiving data stream sent by an upper layer network element thereof, and said method comprising:

said first network element sending a request including first information and identification information of the data stream to said second network element, wherein, the request is used to acquire radio link control sequence number of a radio link control protocol data unit corresponding to a data packet indicated by the first information in the data stream;

said second network element receiving said request and returning second information to said first network element according to said request;

said first network element receiving the second information and allocating the radio link control sequence number carried in the second information to the radio link control protocol data unit in said first network element.

2. A method of claim 1, wherein, said first information comprises at least one of the following: time stamp information of a data burst in said data stream, sequence number of a data packet in said data stream, and identifier of a data burst in said data stream allocated by the upper layer network element of said first and second network elements.

3. A method of claim 2, wherein, in a condition that said first information is the time stamp of a data burst of the data stream, the processing of said second network element returning second information to said first network element according to said request comprises:

said second network element taking the radio link control sequence number of a first radio link control protocol data unit corresponding to a first data packet in the data burst corresponding to said time stamp information as said second information and returning said second information to said first network element.

4. A method of claim 2, wherein, in a condition that said first information is the identifier of a data burst in said data stream, the processing of said second network element returning second information to said first network element according to said request comprises:

said second network element taking the radio link control sequence number of a first radio link control protocol data unit corresponding to a first data packet in the data burst corresponding to said identifier of the data burst as said second information and returning said second information to said first network element.

5. A method of claim 2, wherein, in a condition that said first information is the sequence number of a data packet in said data stream, the processing of said second network element returning second information to said first network element according to said request comprises:
said second network element taking the radio link control sequence number of a first radio link control protocol data unit corresponding to the data packet corresponding to the sequence number of said data packet as said second information and returning said second information to said first network element.

6. A method of claim 2, wherein, in a condition that said first information is the sequence number of a data packet in said data stream, the processing of said second network element returning second information to said first network element according to said request comprises:
said second network element taking the radio link control sequence number of a first radio link control protocol data unit corresponding to the data packet corresponding to the sequence number of said data packet and offset information of said data packet in said radio link control protocol data unit as said second information and returning said second information to said first network element.

7. A method of claim 1, wherein,
said upper layer network element of said first and second network elements comprises one of the following: a multimedia broadcast multicast service gateway in long term evolution system, a master radio network controller in the universal terrestrial radio access network, and a master node B+in the enhanced high speed packet access system;
said first and second network elements comprise one of the following: node B in long term evolution system, a slave radio network controller in the universal terrestrial radio access network, and a slave node B+in the enhanced high speed packet access system.

8. A method of claim 1, wherein, said data stream comprises a plurality of data bursts.

9. A method of claim 1, wherein,
in a condition that said data stream is a data packet stream of a multimedia broadcast multicast service, the identification information of said data stream comprises at least one of the following: a service identifier of said multimedia broadcast multicast service, and a signaling connection identifier established by said first and second network elements for said data stream;
in a condition that said data stream is a plurality of data packet streams of the multimedia broadcast multicast service, said identification information of the data stream comprises at least one of the following: an identifier allocated by the upper network element of said first and second network elements to said data stream, and a signaling connection identifier established by said first and second network elements for said data stream.

10. A method of claim 1, wherein, said data burst is a group of data packets identified with the same time stamp information; alternatively, said data burst is a group of data packets on which radio link control concatenation is performed simultaneously; alternatively, said data burst is a data packet.

11. A method for recovering synchronization among transmitted service data, said method comprising:
a first network element sending identification information of data stream received by the first network element to a second network element, wherein, the identification information of the data stream is used to request for a radio link control sequence number of a radio link control protocol data unit corresponding to a data packet in the data stream;
the first network element receiving response information returned from the second network element according to the identification information of the data stream, wherein, the response information carries first information and the radio link control sequence number of the radio link control protocol data unit in the data stream corresponding to the identification information of the data stream, wherein, the first information is used to identify the radio link control protocol data unit.

12. A method of claim 11, wherein, said first information comprises at least one of the following: time stamp information of a data burst in said data stream, an identifier of a data burst in said data stream allocated by an upper layer network element of said first and second network elements, and a sequence number of a data packet in said data stream.

13. A method of claim 12, wherein, in a condition that said first information is the time stamp information of a data burst in said data stream allocated by the upper layer network element of said first and second network elements, said radio link control sequence number of the radio link control protocol data unit is the radio link control sequence number of the first radio link control protocol data unit corresponding to a first data packet in the data burst, correspondingly, after said first network element receives said response information, said first network element determines a corresponding data burst according to said time stamp information and allocates said radio link control sequence number to the first radio link control protocol data unit corresponding to the first data packet in said data burst.

14. A method of claim 12, wherein, in a condition that said first information is the sequence number of a data packet in said data stream, the radio link control sequence number of the radio link control protocol data unit is the radio link control sequence number of the first radio link control protocol data unit corresponding to the data packet, correspondingly, after said first network element receives said response information, said first network element determines the corresponding data packet according to said data packet sequence number and allocates said radio link control sequence number to the first radio link control protocol data unit corresponding to said data packet.

15. A method of claim 12, wherein, in a condition that said first information is the identifier of a data burst in said data stream allocated by the upper network element of said first network element and second network element, the radio link control sequence number of the radio link control protocol data unit is the radio link control sequence number of the first radio link control protocol data unit corresponding to the first data packet in the data burst, correspondingly, after said first network element receives said response information, said first network element determines the corresponding data burst according to said identifier of the data burst and allocates said radio link control sequence number to the first radio link control protocol data unit corresponding to the first data packet in said data burst.

16. A method of claim 11, wherein,
said upper layer network element of said first and second network elements comprises one of the following: a multimedia broadcast multicast service gateway in long term evolution system, a master radio network controller in the universal terrestrial radio access network, and a master node B+ in the enhanced high speed packet access system;

said first and second network elements comprise one of the following: a node B in long term evolution system, a slave radio network controller in the universal terrestrial radio access network, and a slave node B+ in the enhanced high speed packet access system.

17. A method of claim 11, wherein, in a condition that said data stream is data packet stream of a multimedia broadcast multicast service, the identification information of said data stream comprises at least one of the following: a service identifier of said multimedia broadcast multicast service and a signaling connection identifier established for said data stream by said first and second network elements;

in a condition that said data stream is a plurality of data packet streams of the multimedia broadcast multicast service, said identification information of the data stream comprises at least one of the following: an identifier allocated to said data stream by said first and second network elements and a signaling connection identifier established for said data stream by said first and second network elements.

18. An apparatus for recovering synchronization among transmitted service data, located in a first network element, and said apparatus comprising:

a transmission module, used to send a request to a second network element, wherein, the request carries first information and identification information of data stream received by said first network element, wherein, the request is used to acquire a radio link control sequence number of a radio link control protocol data unit corresponding to a data packet indicated by the first information in the data stream;

a processing module, used to receive second information returned by the second network element according to the request and allocate the radio link control sequence number carried in the second information to the radio link control protocol data unit in the first network element.

19. An apparatus for recovering synchronization among transmitted service data located in a first network element, and the apparatus comprising:

a transmission module, used to send identification information of received data stream to the second network element, wherein, the identification information of the data stream is used to request for a radio link control sequence number of a radio link control protocol data unit corresponding to a data packet in the data stream;

a processing module, used to receive response information returned by the second network element according to identification information of the data stream, wherein, the response information carries first information and radio link control sequence number of the radio link control protocol data unit in the data stream corresponding to the identification information of the data stream, wherein, the first information is used to indicate the radio link control protocol data unit.

\* \* \* \* \*